(12) United States Patent
Lay

(10) Patent No.: US 11,590,588 B2
(45) Date of Patent: Feb. 28, 2023

(54) EDGE-REMOVING TOOL FOR SHEET METAL

(71) Applicant: WS Wieländer + Schill Professionelle Karosserie-Spezialwerkzeuge GmbH & Co. KG, Tuningen (DE)

(72) Inventor: Norbert Lay, Bondorf (DE)

(73) Assignee: WS Wieländer + Schill Professionelle Karosserie-Spezialwerkzeuge GmbH & Co. KG, Tuningen (DE)

( * ) Notice: Subject to any disclaimer, the term of this patent is extended or adjusted under 35 U.S.C. 154(b) by 23 days.

(21) Appl. No.: 17/273,920

(22) PCT Filed: Aug. 9, 2019

(86) PCT No.: PCT/EP2019/071421
§ 371 (c)(1),
(2) Date: Mar. 5, 2021

(87) PCT Pub. No.: WO2020/048731
PCT Pub. Date: Mar. 12, 2020

(65) Prior Publication Data
US 2021/0354212 A1 Nov. 18, 2021

(30) Foreign Application Priority Data

Sep. 7, 2018 (DE) .................. 20 2018 105 118.0
Nov. 13, 2018 (DE) .................. 20 2018 106 425.8
Apr. 30, 2019 (DE) .................. 20 2019 102 442.9

(51) Int. Cl.
*B23C 3/12* (2006.01)

(52) U.S. Cl.
CPC ............ *B23C 3/12* (2013.01); *B23C 2255/08* (2013.01)

(58) Field of Classification Search
CPC ........... B23C 3/12; B23C 3/122; B23C 3/126; B23C 3/128; B23C 1/20; B23C 2255/12; B23C 2255/08; B23C 2255/00; B23B 49/008; B26D 3/02; Y10T 409/30784; Y10T 409/307952; Y10T 409/304144;
(Continued)

(56) References Cited

U.S. PATENT DOCUMENTS 2,304,405 A * 12/1942 Green .................. B23Q 35/105
409/179
4,792,266 A * 12/1988 Willis ..................... B23C 3/126
409/182
(Continued)

FOREIGN PATENT DOCUMENTS

DE 1403736 A1 * 11/1968
DE 3338285 A1 5/1985
(Continued)

OTHER PUBLICATIONS

Description WO0214004A1 (translation) obtained at https://worldwide.espacenet.com/ (last visited Apr. 14, 2022).*

*Primary Examiner* — Ryan Rufo
(74) *Attorney, Agent, or Firm* — Smartpat PLC

(57) ABSTRACT

An edge-removing tool for sheet metal includes a head with a rotating cutting tool. The head has at least one guide for an edge. The head preferably includes a sleeve with the guide. The tool can be used to separate edges of an angled and/or welded sheet metal connection.

8 Claims, 10 Drawing Sheets

(58) Field of Classification Search
CPC ... Y10T 409/30644; Y10T 409/308176; Y10T 409/308624; B23Q 9/0007
See application file for complete search history.

(56) References Cited

U.S. PATENT DOCUMENTS

| | | | | |
|---|---|---|---|---|
| 4,881,857 | A * | 11/1989 | Tanaka | B23C 3/126 |
| | | | | 409/138 |
| 5,228,489 | A * | 7/1993 | Werber | B23Q 35/104 |
| | | | | 409/184 |
| 6,264,408 | B1 * | 7/2001 | Lung | B24B 23/005 |
| | | | | 279/157 |
| 9,610,639 | B2 * | 4/2017 | Ebrahimi | B23B 49/00 |
| 11,247,279 | B2 * | 2/2022 | Berube | B27D 5/006 |
| 2002/0182023 | A1 * | 12/2002 | Lai | B27C 5/10 |
| | | | | 409/137 |
| 2005/0002747 | A1 | 1/2005 | Adkins et al. | |
| 2012/0074635 | A1 * | 3/2012 | Vasis | B25F 3/00 |
| | | | | 269/293 |
| 2014/0271013 | A1 * | 9/2014 | Heck | B23C 3/126 |
| | | | | 409/140 |
| 2016/0311042 | A1 | 10/2016 | Yehud | |
| 2021/0178494 | A1 * | 6/2021 | Davidov | B28D 1/183 |

FOREIGN PATENT DOCUMENTS

| | | | |
|---|---|---|---|
| DE | 3929733 A1 | 3/1990 | |
| DE | 9306249 U1 * | 9/1993 | |
| DE | 202011004152 U1 * | 7/2011 | ............ B23C 1/20 |
| DE | 202017101024 U1 * | 4/2017 | ........... B23C 3/126 |
| EP | 0786301 A1 | 7/1997 | |
| JP | S61219510 A | 9/1986 | |
| JP | 09011019 A * | 1/1997 | ........... B23C 3/126 |
| WO | WO-0214004 A1 * | 2/2002 | ........... B23C 3/126 |
| WO | 2005002805 A2 | 1/2005 | |
| WO | 2016170532 A1 | 10/2016 | |

\* cited by examiner

EDGE-REMOVING TOOL FOR SHEET METAL

TECHNICAL FIELD

The disclosure relates to an edge-removing tool for sheet metal, in particular for body panels, which can be used to separate the edge of a folded or joined sheet metal packet.

BACKGROUND

During repair work on vehicles, it is often necessary to remove the edge of a folded sheet metal or of a joined sheet metal packet in order to be able to remove a damaged sheet metal part such as a side wall of a body. Such folded or joined edges are in particular found in the fender area and on door, trunk, and bonnet edges.

With a saw, it is usually hardly possible to cut off a narrow edge in the millimeter range. Therefore, abrasive techniques are primarily employed in practice, in particular using an angle grinder. However, it is rather difficult to guide an angle grinder exactly along the edge of a sheet metal.

The separation of sheet metal edges is therefore cumbersome and implies the risk of unintentionally damaging body substance that is to be preserved.

SUMMARY

Given the above, the disclosure is based on the object of providing a device which can be used to separate edges of folded and/or joined sheet metal in a simple way and with high precision.

The object of the disclosure is achieved by an edge-removing tool for sheet metal as claimed. Preferred embodiments and refinements will be apparent from the subject-matter of the dependent claims, the description and the drawings.

The disclosure relates to an edge-removing tool for sheet metal and other body materials. Edge-removing tool is understood to mean a tool that can be used to separate the edge of a folded sheet metal or the edge of a joined, in particular welded sheet-metal packet. The invention is suitable for all types of sheet metal. The edge-removing tool according to the invention is also suitable for other materials, in particular for fiber composite materials such as carbon fiber reinforced plastic (CFRP) and glass fiber reinforced plastic (GFRP).

The edge-removing tool comprises a head with a rotating cutting tool.

The cutting tool is in particular in the form of a milling cutter.

However, according to another embodiment, the use of a grinding tool, i.e. a tool with a geometrically undefined cutting edge, is likewise conceivable.

The head is preferably arranged on a pneumatically or electrically driven drive, and the rotating cutting tool is coupled to the drive shaft of the drive.

The head comprises at least one guide for an edge, in particular for a sheet metal edge.

Thus, a guide that can be used to move the edge-removing tool of the invention along the sheet metal edge is provided directly on the tool head.

On the one hand, the guide makes the guiding along the edge easier for the user. On the other hand, the guide limits the penetration depth of the rotating cutting tool.

The guide is in particular in the form of a groove, preferably with a triangular cross section.

According to a preferred embodiment, the head comprises a sleeve comprising the guide.

More particularly, the sleeve is axially aligned with the drive shaft and surrounds the rotating cutting tool.

The guide may be provided both on the front end and on the lateral side of the sleeve.

According to a refinement, the head has a respective guide both on its front end and on its lateral side.

With two different guides, the tool can be used in different orientations, so that the rotating cutting tool removes material with its front end in one case, and with its lateral side in another case.

At the same time, it is possible to provide two different guides, in particular one guide that is preferably designed for separating a joined pair of sheets, and a further guide that is designed for removing the edge on a folded joint.

In one embodiment, the head comprises an outer sleeve having a first contact surface for a sheet metal and an inner sleeve having a second contact surface for a sheet metal, with a lateral opening for the rotating cutting tool extending between these contact surfaces.

The inner sleeve is preferably axially slideable relative to the outer sleeve.

A displacement of the inner and outer sleeves relative to one another allows to vary the spacing between the contact surfaces.

This allows in a simple way to adjust the tool in terms of its penetration depth to folded sheet metal edges which enclose different angles.

It is in particular possible to remove edges at which the metal sheets enclose an angle of more than 60°, preferably more than 80°.

In an alternative embodiment, the outer sleeve is not movable, but rather is rigidly joined to the head portion, in particular integrally formed with the head portion.

In this embodiment, the depth of penetration of the milling cutter is determined solely by the height of the bridge next to the lateral guide.

The bridge preferably has opposing contact surfaces.

In one embodiment, the bridge has a step which provides for at least two different penetration depths.

The contact surfaces are preferably inclined with respect to the central axis of the cutting tool, in particular at an angle of 45°±30°, preferably ±10° (i.e. between 15° and 75°, or 35° and 55°).

In order to provide two guides, the outer sleeve may have a guide on its front end, in particular a groove or a step.

The cutting tool is preferably in the form of a shell mill, in particular a shell end mill, preferably with a circular cylindrical cross section.

Shell end mills have additional cutting edges on their front faces and are therefore also suitable for face circumferential milling. Thus, the tool can be used to remove material with both the front face and circumferentially.

In particular with an embodiment in which the sleeve opens to a lateral side, the front end edge of the shell end mill can be used to cut a groove into a smooth metal sheet, similarly to a router.

The disclosure may furthermore relate to an edge-removing tool for sheet metal, which in particular has one or more of the features described above.

The edge-removing tool comprises a head with a rotating cutting tool, and the head has a lateral guide for an edge, in particular a sheet metal edge.

The lateral guide comprises an outer sleeve having a first contact surface for a sheet metal, and an inner sleeve having a second contact surface for a sheet metal.

The outer sleeve can be displaced axially with respect to the inner sleeve, so that the spacing between the first contact surface and the second contact surface can be varied.

The first and second contact surfaces are preferably conical, in particular frustoconical.

As already described above, it is very easy in this way to adapt the tool to the angle of the meeting sheet metal edges for separating sheet metal edges at a fold.

For this purpose, the outer sleeve can preferably be fixed relative to the inner sleeve, for example by means of a screw, in particular by means of a screw that can be actuated without tools, such as a knurled screw.

The outer sleeve may have a further contact surface on the side opposite the first contact surface.

In a completely extended state of the outer sleeve, this additional contact surface will then provide the contact surface on which the sheet metal rests during use.

In this state, the tool is particularly suitable for removing sheet metal folds at which the metal sheets enclose an angle from 0° to 90° or more to one another.

BRIEF DESCRIPTION OF THE DRAWINGS

The subject-matter of the disclosure will now be explained in more detail with reference to exemplary embodiments illustrated by way of the drawings of FIGS. 1 through 15.

FIGS. 10 to 12 are different perspective views.

FIG. 13 shows the tool with the head portion omitted.

DETAILED DESCRIPTION

Figure 1:
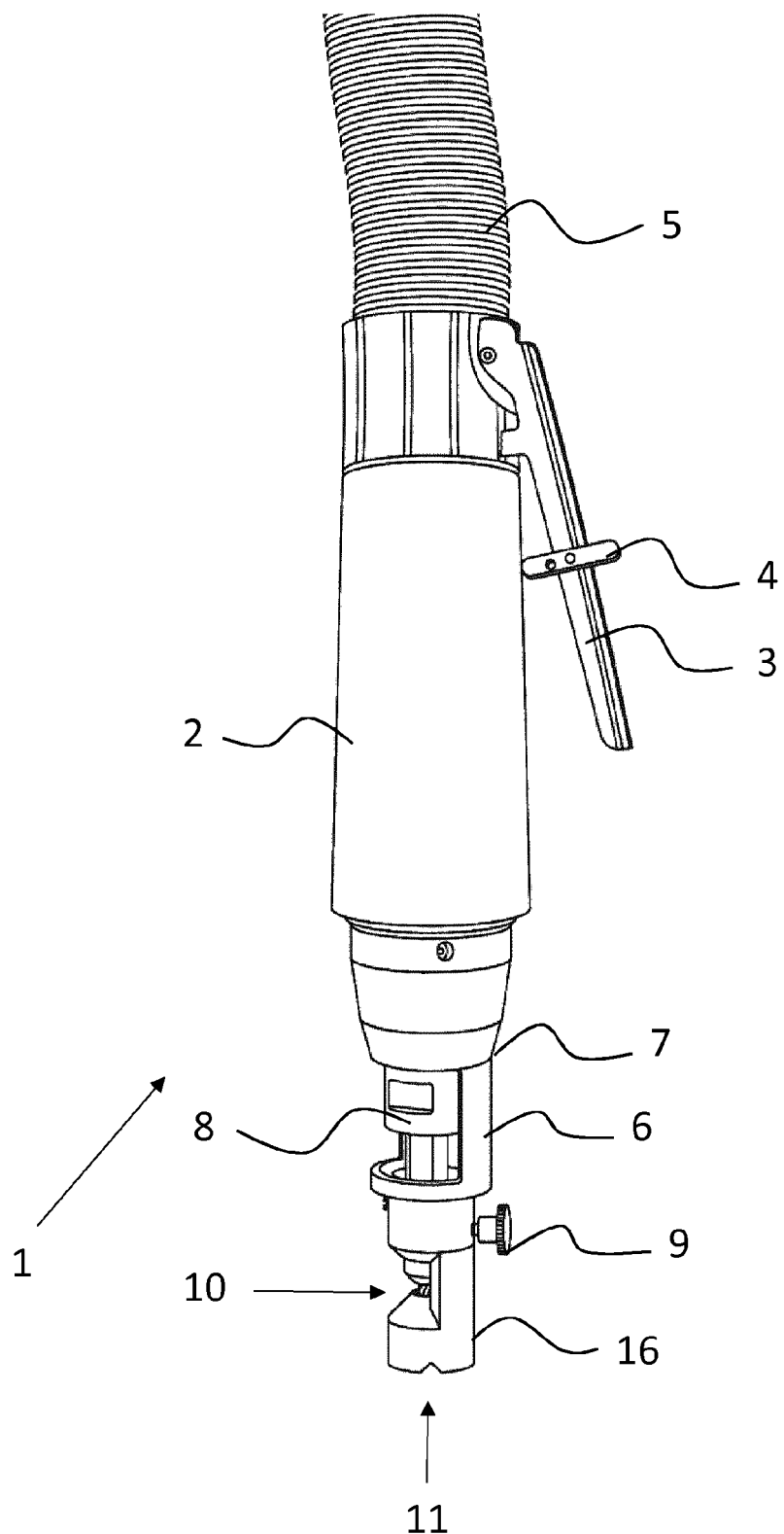
FIG. 1 is a side view of an edge-removing tool.

FIG. 1 shows a side view of one embodiment of an edge-removing tool 1 for sheet metal.

The edge-removing tool 1 comprises a housing 2 including a drive.

In this exemplary embodiment, the edge-removing tool 1 comprises a compressed air motor which is operated via compressed air supply 5.

However, it is also conceivable to use an electrically driven drive.

Edge-removing tool 1 can be turned on via the actuating member 3 which is arranged laterally of the housing 2 in this exemplary embodiment.

In this exemplary embodiment, the actuating member 3 comprises a locking pawl 4 which provides protection against unintentional actuation, since it first has to be turned over in order to actuate the actuating member 3.

Edge-removing tool 1 comprises a drive shaft which is arranged and axially aligned within the housing 2 and which is operable to drive a receptacle 8 for a milling cutter.

Edge-removing tool 1 furthermore comprises a head 6 that is mounted to the housing 2 of edge-removing tool 1 by a flange 7.

Head 6 is axially aligned with respect to the housing 2.

At the front end of head 6, an outer sleeve 16 is provided which, in this exemplary embodiment, has a smaller diameter than the portion of the head 6 adjoining it.

The edge-removing tool has a front end guide 11 and a lateral guide 10.

Guides 10 and 11 allow to move the edge-removing tool along a sheet metal edge in different orientations in order to cut it off.

A rotating cutting tool in the form of a milling cutter 12 is installed in the head portion 6 and is mounted in the receptacle 8 which is in particular in the form of a chuck.

Figure 2:
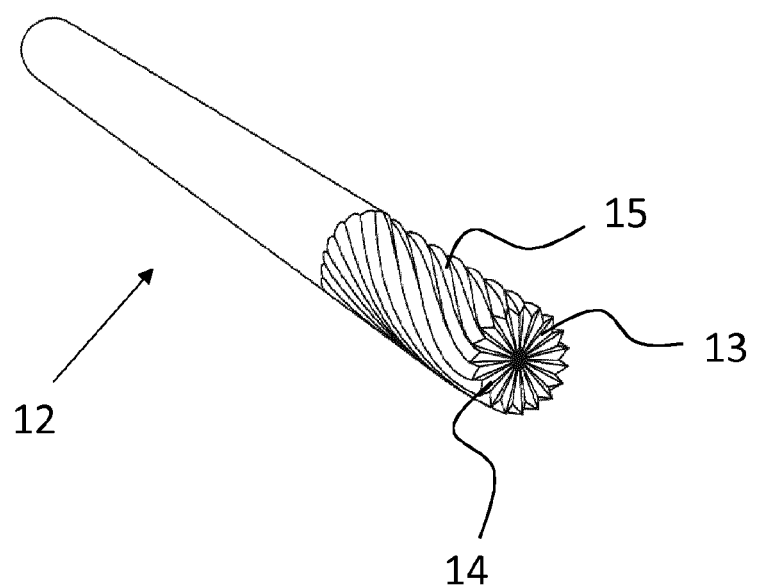
FIG. 2 is a view of the milling cutter used for the edge-removing tool.

Milling cutter 12 is shown in a perspective view according to FIG. 2.

The milling cutter 12 is a shell end mill, comprising a head 13 that has both cutting edges on the lateral side 15 and cutting edges on the end face or front face 14.

The milling cutter preferably has a diameter between 5 and 20 mm.

Figure 3:
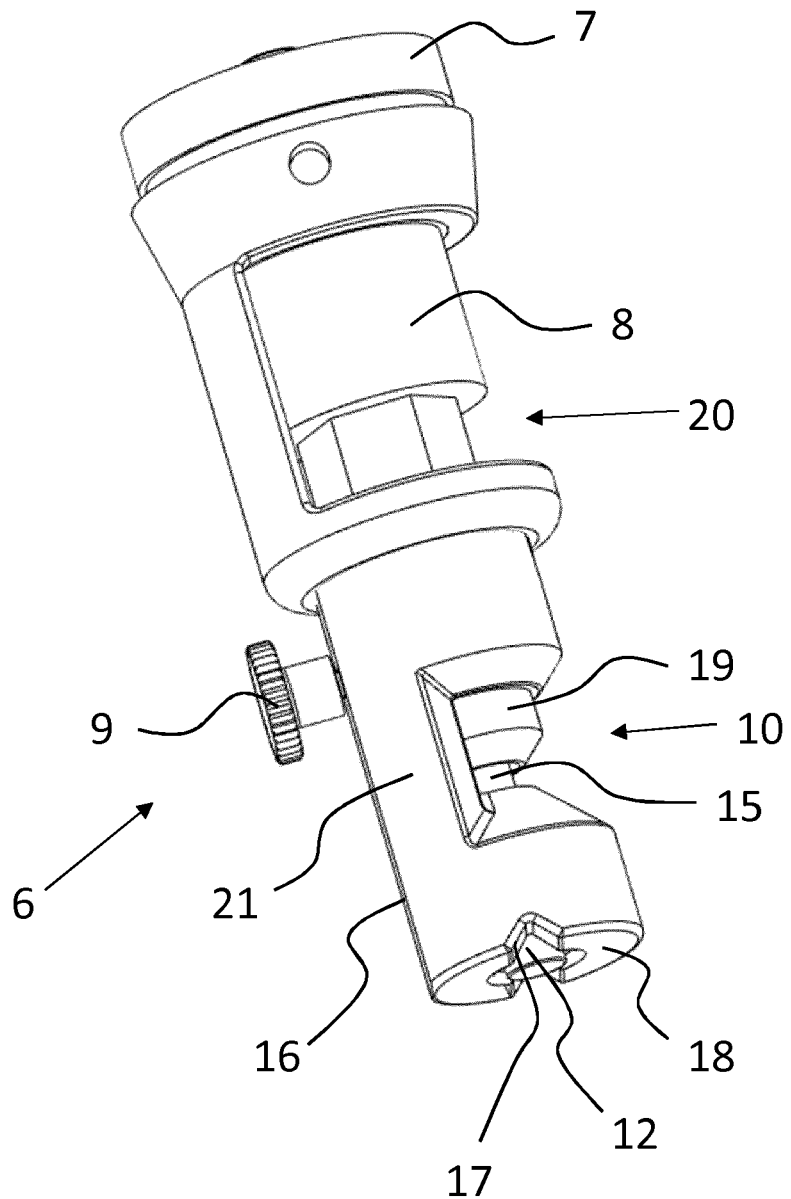
FIG. 3 is a perspective view of the head of the tool.

FIG. 3 is a perspective view of the head 6.

Head 6 comprises the flange 7 which may be in the form of a thread, for example, for fastening the head 6 to the housing of the edge-removing tool.

A milling cutter 12 is mounted in the receptacle 8 which is accessible via a lateral opening 20 of the head 6, and extends axially through the head 6. The receptacle 8 may in particular be in the form of a chuck which can be released through opening 20.

At its front end, the head 6 comprises an outer sleeve 16 which has a substantially circular-cylindrical shape in this exemplary embodiment and which is guided on an inner sleeve 19.

The outer sleeve 16 consists of two portions joined by a bridge 21, such that a lateral opening is provided which provides the lateral guide 10.

Lateral guide 10 provides access to the lateral side 15 of the milling cutter 12 for separating a sheet metal edge.

On its front face, the outer sleeve 16 has a groove 17 which has a triangular cross section in this exemplary embodiment.

In another embodiment, not illustrated here, the outer sleeve 16 has a plurality of grooves on its front face. These grooves may each have a respective different depth. The grooves may be arranged in a star-like pattern. In this way it is possible to vary the depth of penetration of the milling cutter 12 by using different grooves.

Thus, the edge-removing tool of the invention may also be moved along a sheet metal edge with its front face, and the front face of the outer sleeve 16 serves as a front end contact surface 18. Thus, the milling cutter 12 can remove material with its front end.

The outer sleeve 16 can be axially displaced after loosening a screw 9, and can be fixed again by tightening the screw 9.

Figure 4:
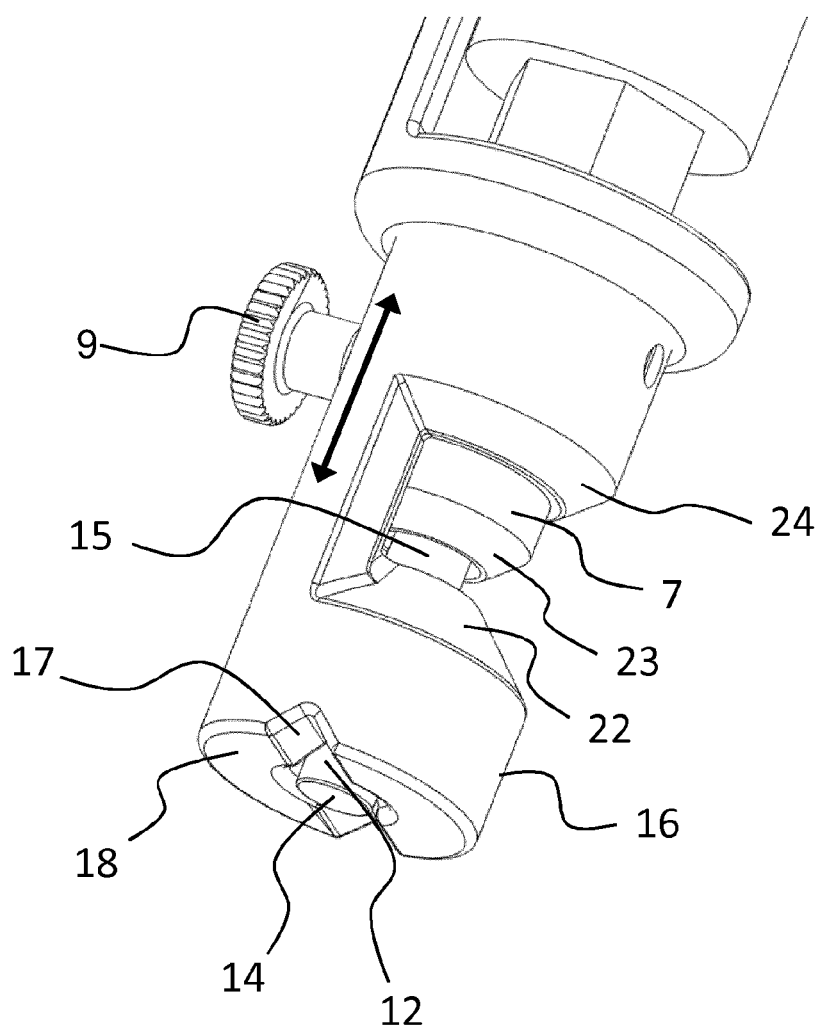
FIG. 4 is a view of a detail.

In the detailed view according to FIG. 4, an arrow symbolizes how the outer sleeve 16 is slideable after the screw 9 has been loosened, which is preferably in the form of a knurled screw.

When the outer sleeve 16 is displaced, the groove 17 on the front face is offset relative to the front face 14 of the milling cutter 12. Since the contact surface 18 rests on the sheet metal, the penetration depth of the milling cutter 12 at the front end can be limited in this way.

The front end guide is primarily adapted for removing the edge of a sheet metal packet consisting of at least two joined metal sheets.

The lateral guide, on the other hand, is rather suitable for separating the edge of a sheet metal fold.

On the lateral side, the outer sleeve 16 has a first contact surface 22 and the inner sleeve has a second contact surface 23.

Contact surfaces 22 and 23 are inclined relative to the rotational axis of the milling cutter 12, in particular at an angle of approximately 45°.

FIG. 4 illustrates the outer sleeve 16 in its fully retracted state.

When the outer sleeve 16 is extended, the spacing between the first contact surface 22 and the second contact surface 23 as defined by the inner sleeve will increase.

The further the contact surfaces 22 and 23 are moved apart, the better the tool will be adapted, in terms of its penetration depth, to an increasing angle of the fold for cutting off the edge of the fold using the lateral side 15 of the milling cutter 12.

In this exemplary embodiment, the outer sleeve 16 has a further contact surface 24 opposite contact surface 22.

In the fully extended state (not shown), the contact surface 24 moves over the contact surface 23 so that the metal sheets meeting at an edge will then abut on contact surfaces 22 and 24 of the outer sleeve.

In this exemplary embodiment, the inclination of contact surface 24 corresponds approximately to the inclination of contact surfaces 23 and 22.

Thus, the tool according to the invention is compact and is at the same time suitable for separating the edge of folds at which the metal sheets enclose different angles.

Figure 5:
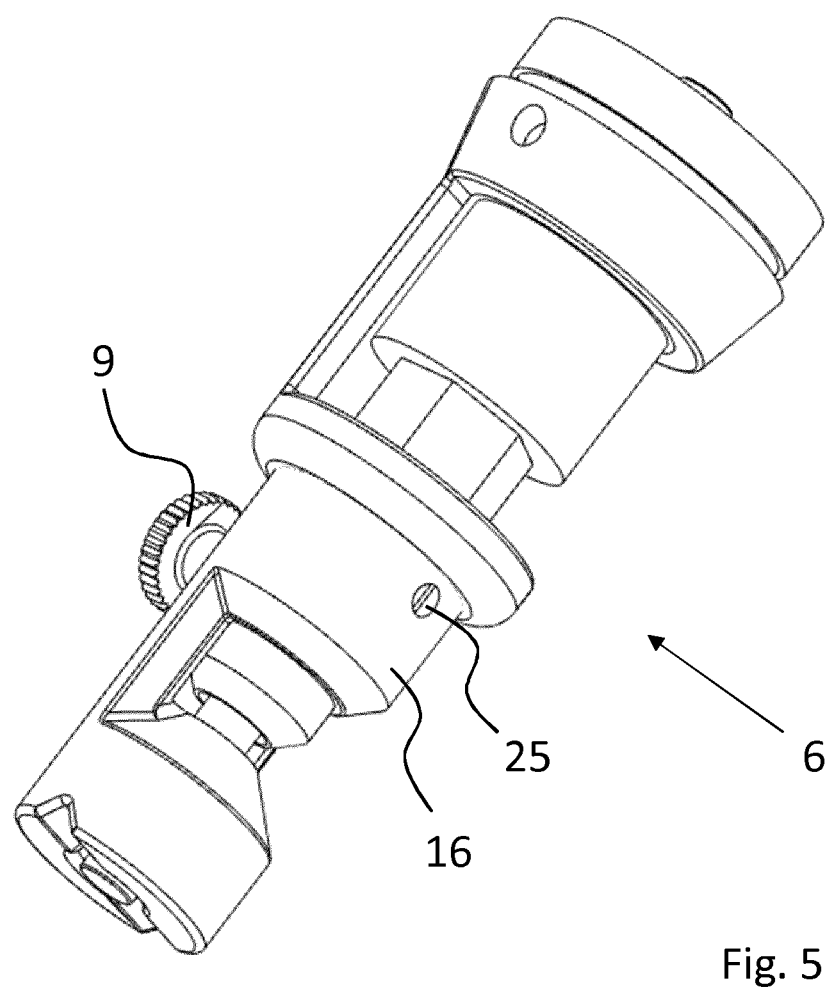
FIG. 5 is another perspective view of the head.

FIG. 5 shows a further perspective view of the head 6.

On the side of outer sleeve 16 opposite the screw 9, a grub screw 25 is provided which serves as an additional guide and prevents the tool from falling apart when the screw 9 is completely loosened.

Figure 6:
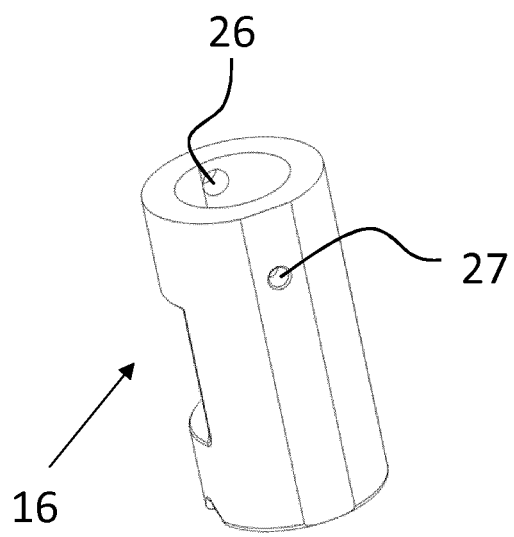
FIGS. 6 and 7 are perspective views of the outer sleeve of the head.

FIG. 6 is a perspective view of outer sleeve 16.

Outer sleeve 16 has a first thread 26 for the screw for loosening and moving the outer sleeve, and a second thread 27 for a grub screw 25.

Figure 7:
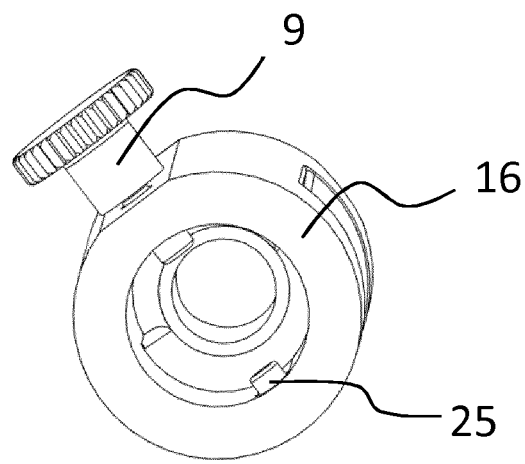

FIG. 7 is a further perspective view of the outer sleeve 16, now with the screw 9 and the grub screw 25 installed, wherein screw 9 is in the form of a knurled screw which is operative as an adjusting member.

It can be seen that both screw 9 and grub screw 25 protrude into the interior of outer sleeve 16.

Figure 8:
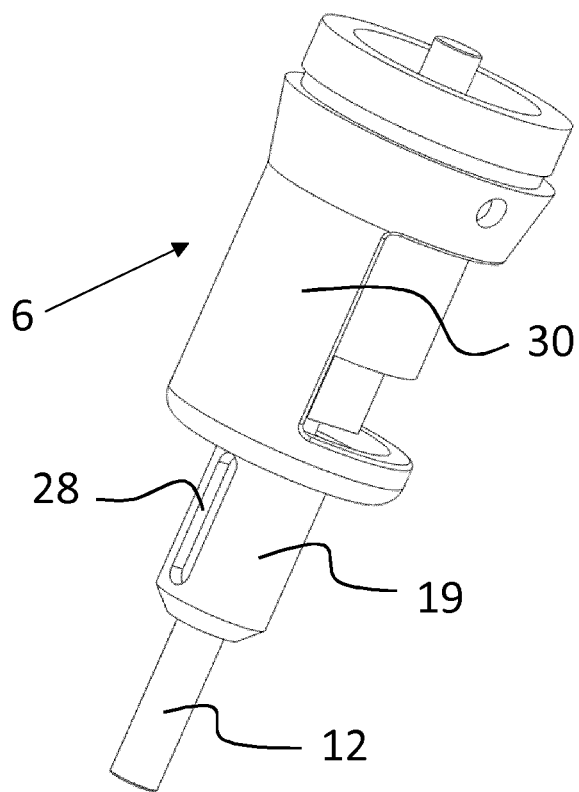
FIGS. 8 and 9 are perspective views of the head with the outer sleeve removed.

FIG. 8 is a perspective view of the head 6 with the outer sleeve removed. Head 6 comprises a head portion 30 which can be coupled to the tool housing and which includes the chuck for the milling cutter 12, and inner sleeve 19 protruding from the front end of the head portion.

Also, the milling cutter 12 can be seen protruding from the front end of the inner sleeve 19.

The inner sleeve 19 has a slot 28 in the form of a groove, in which the screw shown in FIG. 7 engages.

The outer sleeve is axially displaceable along this groove.

When the screw (9 in FIG. 7) which serves as an adjusting member is tightened, it will engage on the bottom of slot 28, so that the outer sleeve can be fixed by being clamped.

Figure 9:
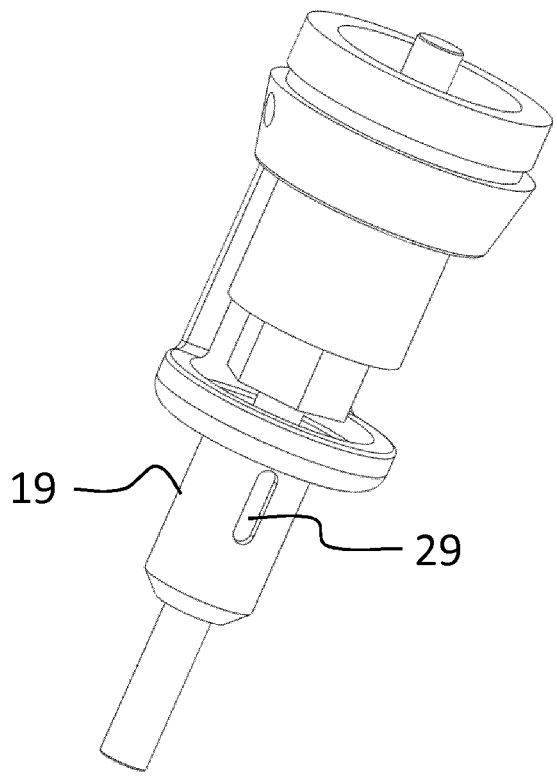

In the perspective view of FIG. 9, it can be seen that the inner sleeve 19 has a further slot 29 in which the grub screw (25 in FIG. 7) engages.

Thus, in cooperation with slot 29, the grub screw 25 provides a further guide.

At the same time, the grub screw 25 is not adapted to be opened or tightened by the user.

If the user unscrews the screw 9 that serves as an adjusting member to such an extent that it no longer engages in slot 28, the grub screw 25 which is guided in slot 29 and abuts on the front end of slot 29 will prevent the outer sleeve from becoming detached from the head.

With reference to FIGS. 10 to 13, an alternative embodiment of the invention will be explained in more detail, in which the edge-removing tool 1 does not have an axially displaceable outer sleeve, in contrast to the embodiment illustrated in FIGS. 1 to 9.

Figure 10:
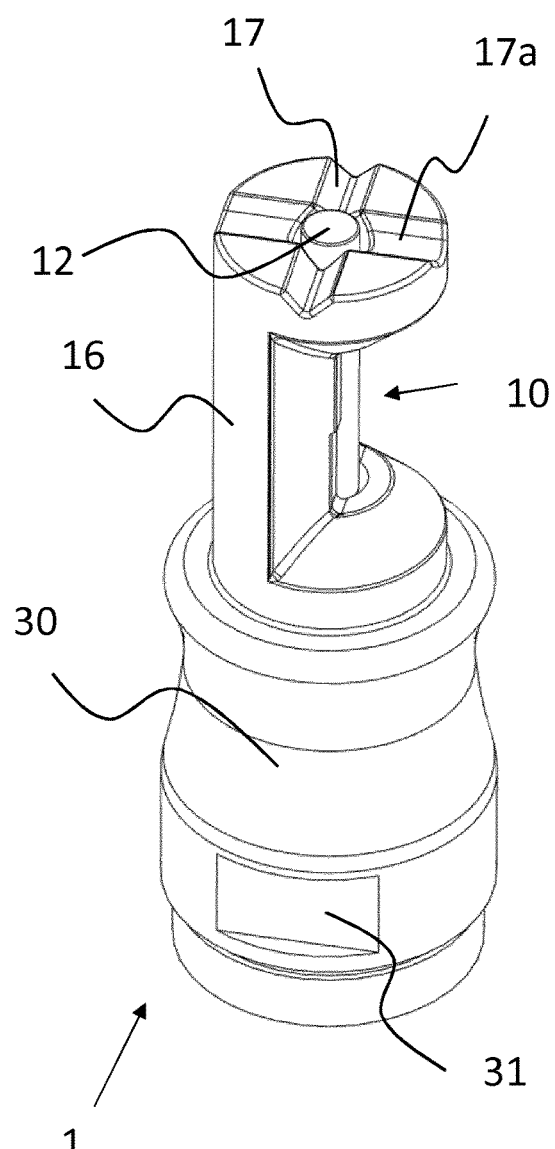
FIGS. 10 to 13 show an alternative embodiment of an edge-removing tool in which the outer sleeve is not designed to be slideable.
Figure 11:
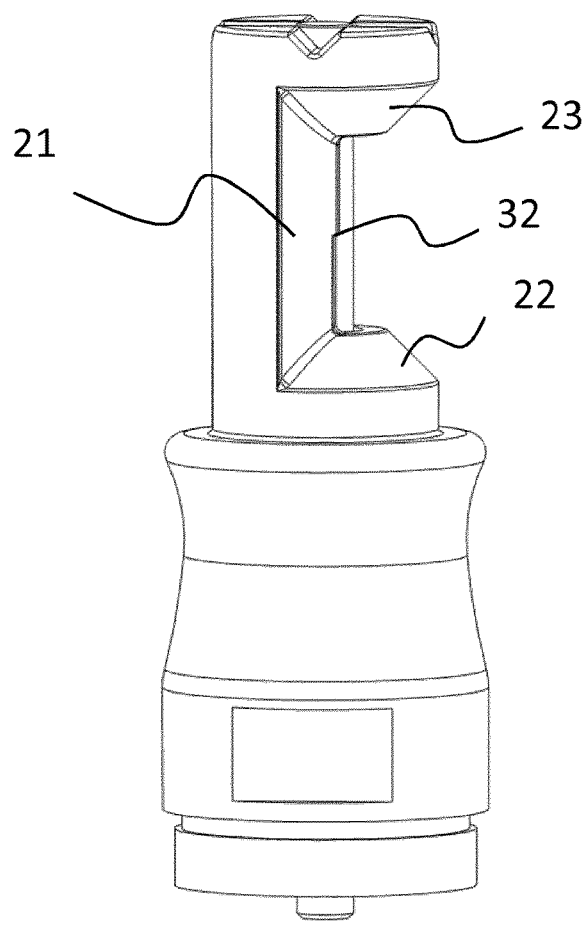

FIG. 10 is a perspective view of the edge-removing tool.

In contrast to the embodiment shown in FIGS. 1 to 9, the edge-removing tool 1 has two grooves 17, 17a on its front face. Grooves 17, 17a intersect each other in a star-like pattern and provide for different penetration depths.

In this exemplary embodiment, groove 17 is formed with a triangular profile, whereas groove 17a has a fillet shape.

Furthermore, in contrast to the exemplary embodiment according to FIGS. 1 to 9, the outer sleeve 16 is not designed to be adjustable, but is formed integrally with the head portion 30.

Thus, a lateral guide 10 is provided, in which the penetration depth cannot be varied by adjusting the outer sleeve 16.

Rather, in this exemplary embodiment, the bridge 21 has a step 32 that is provided between contact surfaces 22 and 23, which provides for two different penetration depths.

Figure 12:
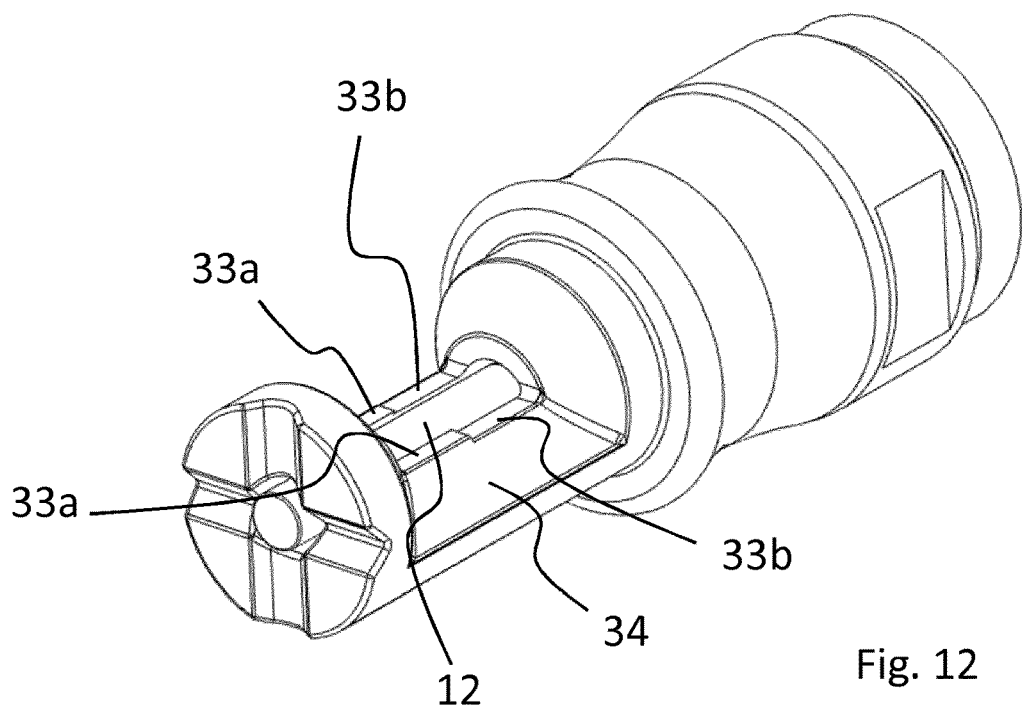

As can be seen in the perspective view of FIG. 12, the step defines substantially planar contact surfaces 33a, 33b which limit the depth of penetration of the milling cutter 12.

Adjoining the contact surfaces 33a, 33b, the bridge has inclined contact surfaces 34.

Furthermore, as can be seen in particular in FIG. 10, the tool shown in FIGS. 10 to 13 does not comprises a head 30 with a lateral opening for receiving the milling cutter.

Rather, in this exemplary embodiment, the head 30 has an engagement profile 31 which is in the form of a flattened area for engagement of an open-end wrench.

The head 30 can thus be mounted to the housing of the tool independently of the milling cutter.

Figure 13:
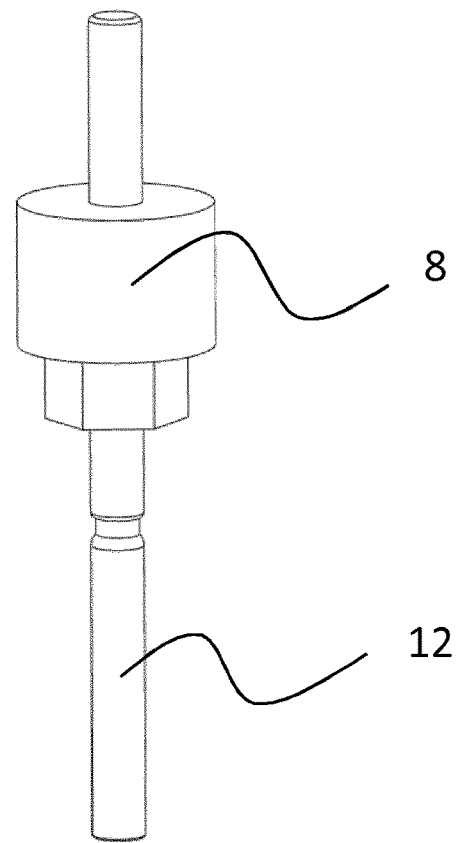

FIG. 13 is a view with the head portion omitted.

The milling cutter 12 is installed in the milling cutter receptacle 8 which is directly coupled to the drive shaft.

Once the milling cutter 12 has been installed, the head portion can simply be slipped over it and screwed to the housing (2 in FIG. 1).

The embodiment shown in FIGS. 10 to 13 has a simpler design, and adjustment of the sleeve can be dispensed with.

On the other hand, the embodiment shown in FIGS. 10 to 13 only provides an edge-removing tool in which the penetration depth is not adjustable, but rather is fixed by the stops.

Figure 14:
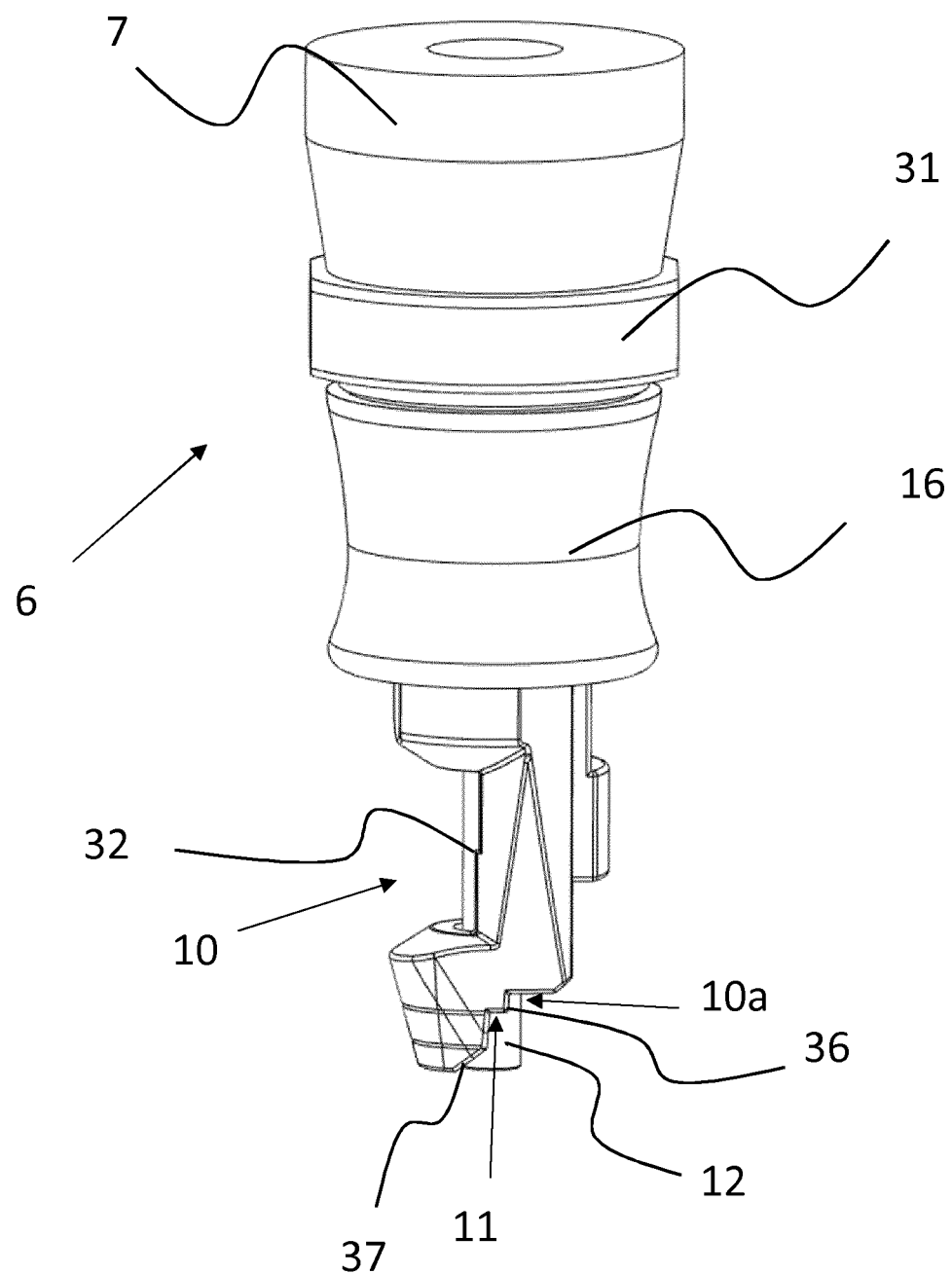
FIG. 14 shows a further embodiment of an edge-removing tool in a perspective view.

FIG. 14 shows a perspective view of a further embodiment of an edge-removing tool. The head 6 is coupled to the housing shown in FIG. 1 via flange 7.

In this embodiment of the invention, the outer sleeve 16 is axially displaceable by having an internal thread that is screwed onto an inner sleeve.

The user can fix the outer sleeve 16 in the desired position by means of a lock nut 35.

Similarly to the configuration of the edge-removing tool shown in FIGS. 10 to 13, the lateral guide 10 comprises a step 32 in order to provide for two different depths of cut.

In this embodiment of the invention, the head 6 comprises a further lateral guide 10*a* and the front end guide 11.

For this purpose, the outer sleeve 16 is open peripherally on one side, so that the sheet metal edge to be machined can reach the milling cutter 12 from the side.

In this way, the tool may even be placed on the smooth upper surface of a sheet, for example in order to produce a slit along the upper surface of the sheet, like a router.

In this case, the limitation of the depth of penetration of the milling cutter 12 by the lateral guide 10 will ensure that the sheet metal or structural parts underneath, such as supports, are not damaged.

A step or shoulder 36 provides the front end guide 11. Thus, the front end guide 11 is in the form of an angle.

Furthermore, the step 36 provides a further front end lateral guide 10*a*, which is also in the form of an angle.

An inclined surface 37 at the front end of the outer sleeve 11 allows to round off edges, for example.

Figure 15:
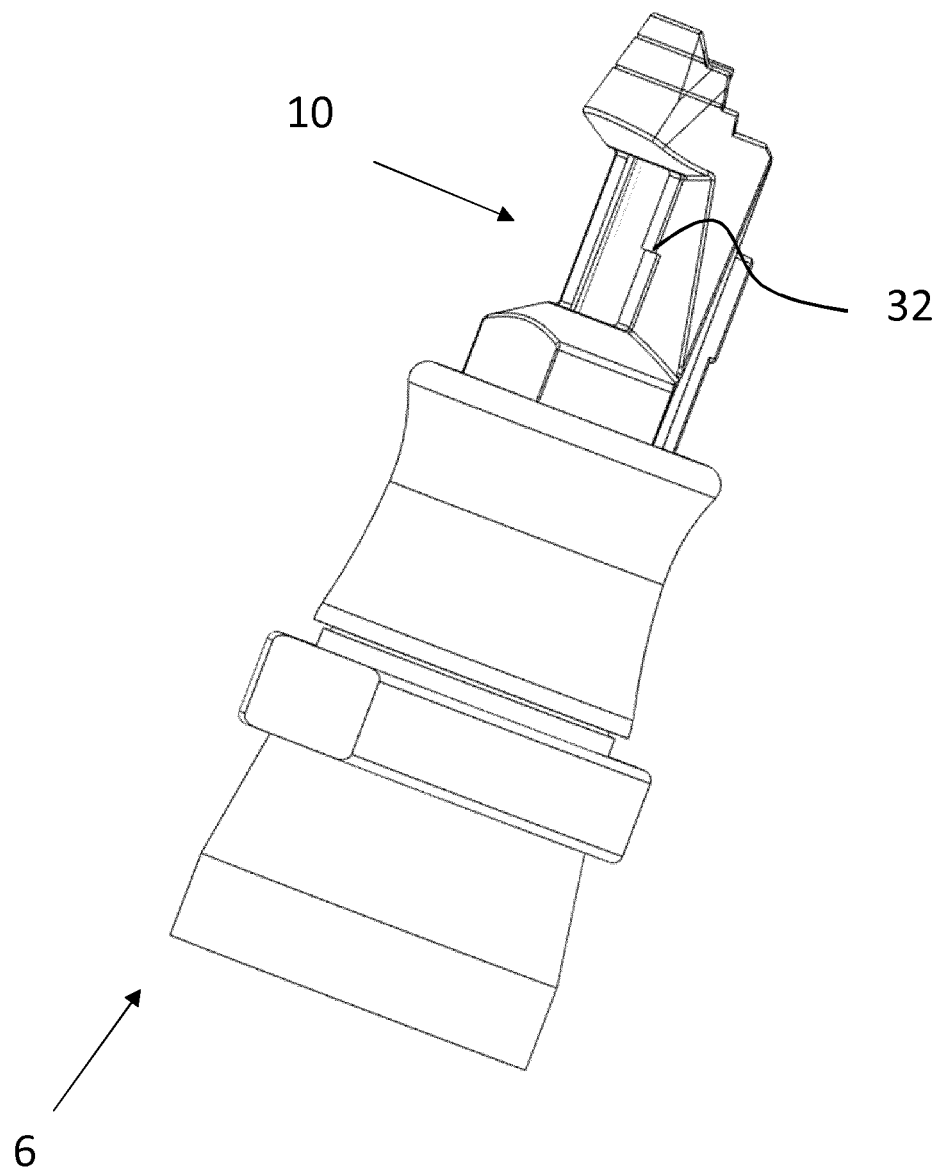
FIG. 15 is another perspective view of the edge-removing tool illustrated in FIG. 14.

FIG. 15 is a further perspective view of the embodiment of the head 6, as shown in FIG. 14, of an edge-removing tool.

As can be seen in this view, in contrast to the edge-removing tool shown in FIGS. 10 to 13, the step 32 of the lateral guide is only provided on one side.

This has the advantage that the user only has to keep an eye on the side of the head 6 provided with the step 32 when using the tool. The side without a step can remain placed on the metal sheet without the user having to pay attention to the point of the lateral guide 10 at which the sheet metal rests. Rather, the single step 32 on one side of the lateral guide 10 is sufficient for depth adjustment. This makes it easier to guide the tool.

The invention permits to provide a tool that is easy to handle and can be used to remove edges with high precision, both on folds and on sheet metal joints.

LIST OF REFERENCE NUMERALS

1 Edge-removing tool
2 Housing including drive
3 Actuating member
4 Locking pawl
5 Compressed air supply
6 Head
7 Flange
8 Receptacle for milling cutter
9 Screw
10 Lateral guide
10*a* Further lateral guide
11 Front end guide
12 Milling cutter
13 Head of milling cutter
14 Front face of milling cutter
15 Lateral side
16 Outer sleeve
17, 17*a* Groove
18 Front face contact surface
19 Inner sleeve
20 Lateral opening
21 Bridge
22 First contact surface
23 Second contact surface
24 Further contact surface
25 Grub screw
26 Thread
27 Thread
28 Slot
29 Slot
30 Head portion
31 Engagement profile
32 Step
33*a,b* Contact surface
34 Inclined surface
35 Lock nut
36 Step
37 Inclined surface

The invention claimed is:

1. A metal cutting tool, comprising
   a milling cutter, the milling cutter being rotatable around an axis of rotation, the axis of rotation defining an axially forward direction and an axially rearward direction, and
   a head comprising a sleeve with a front end guide,
   wherein the front end guide of the sleeve comprises
      a front face contact surface extending transversely to the axis of rotation, the front face contact surface being an axially forward-most surface of the head, and
      a front guide recess in an exterior periphery of the sleeve, the front guide recess comprising
         a shoulder comprising a first shoulder surface extending perpendicular to the axis of rotation and a second shoulder surface extending parallel to the axis of rotation and axially rearward from the first shoulder surface, the shoulder being axially rearward of the front face contact surface,
         a lateral guide surface extending parallel to the axis of rotation between the front face contact surface and the shoulder, and
         an axial abutment surface extending perpendicular to the axis of rotation, the axial abutment surface being axially rearward of the shoulder,
   wherein, the lateral guide surface directly connects to the first shoulder surface, the first shoulder surface directly connects to the second shoulder surface, and the second shoulder surface directly connects to the axial abutment surface,
   wherein the front face contact surface is connected to the lateral guide surface by an inclined surface,
   wherein the milling cutter has cutting edges on a lateral side and cutting edges on a front face,
   wherein a plane defined by the first shoulder surface intersects the cutting edges on the lateral side of the milling cutter, and
   wherein the sleeve is axially displaceable.

2. The metal cutting tool as claimed in claim 1, further comprising a lateral guide step located axially rearward of the front guide recess to provide different penetration depths of the milling cutter.

3. The metal cutting tool as claimed in claim 1, wherein the sleeve further comprises
   an outer sleeve and an inner sleeve,
   an additional recess axially rearward of the front guide recess, the additional recess exposing the milling cutter,
   the outer sleeve having a first contact surface that partially forms a boundary of the additional recess, and
   the inner sleeve having a second contact surface that partially forms another boundary of the additional recess, the additional recess including a lateral opening for the milling cutter, the lateral opening extending between the first contact surface and the second contact surface.

4. The metal cutting tool of claim 3, wherein the outer sleeve is axially displaceable relative to the inner sleeve.

5. The metal cutting tool as claimed in claim 1, wherein the milling cutter is a shell end mill.

6. The metal cutting tool as claimed in claim 1, wherein the sleeve further comprises an additional recess axially rearward of the front guide recess, the additional recess exposing the milling cutter.

7. The metal cutting tool as claimed in claim 5, wherein the shell end mill has a cylindrical shape, and wherein the shell end mill has a diameter between 5 mm and 20 mm.

8. The metal cutting tool as claimed in claim 6, wherein the sleeve circumferentially encloses a portion of the milling cutter at a point of the sleeve between the front guide recess and the additional recess.

\* \* \* \* \*